United States Patent [19]

Takahashi et al.

[11] Patent Number: 5,052,750
[45] Date of Patent: Oct. 1, 1991

[54] TILTABLE AUXILIARY CHAIR HAVING LOCKING MEANS AND PIVOTAL SEAT BELT ENGAGEMENT PLATE FOR FORWARD AND REARWARD FACING

[75] Inventors: Takehiko Takahashi; Takashi Watanabe; Tomihiro Kaneko, all of Tokyo, Japan

[73] Assignee: Combi Corporation, Tokyo, Japan

[21] Appl. No.: 498,519

[22] Filed: Mar. 26, 1990

[30] Foreign Application Priority Data

Dec. 21, 1989 [JP] Japan .................. 1-146529[U]

[51] Int. Cl.$^5$ ............ A47C 1/08; A47D 1/10
[52] U.S. Cl. ................. 297/250; 297/310; 297/325
[58] Field of Search ............... 297/250, 253, 254, 257, 297/310, 464, 468, 485, 325–328, 313, 244, 130; 248/371, 372.1, 393, 394, 395, 396, 397, 398

[56] References Cited

U.S. PATENT DOCUMENTS

| 3,975,050 | 8/1976 | McKee ................. 297/328 |
| 4,632,456 | 12/1986 | Kassni ................ 297/250 X |
| 4,634,177 | 1/1987 | Meeker ................ 297/250 |
| 4,679,852 | 7/1987 | Anthony et al. ....... 297/250 X |
| 4,911,499 | 3/1990 | Mecker ............... 297/130 X |
| 4,913,490 | 4/1990 | Takahashi et al. ..... 297/468 X |

FOREIGN PATENT DOCUMENTS

| 164909 | 5/1984 | European Pat. Off. . |
| 325352 | 1/1988 | European Pat. Off. . |
| 331299 | 2/1988 | European Pat. Off. . |
| 235137 | 9/1988 | Japan ................. 297/250 |
| 2136685 | 9/1984 | United Kingdom . |
| 2165745 | 4/1986 | United Kingdom . |
| 2216405 | 11/1989 | United Kingdom . |

Primary Examiner—Laurie K. Cranmer
Assistant Examiner—James M. Gardner
Attorney, Agent, or Firm—Sughrue, Mion, Zinn, Macpeak & Seas

[57] ABSTRACT

An auxiliary chair for use in restraining young children in vehicles. The chair is capable of either frontward or backward orientation and in each case the portion thereof that engages the seat belt of the vehicle remains in the same relative position. The engagement portion is on an engagement arm that is movable between a frontward and a rearward position, and in each position locks both the chair body and the chair base thereto for security. The chair is tiltable to several orientations and is locked into several tilt positions via a shaft through the body that rides in a slot within locking plates in the base. The locking plate locks the position due to springs forcing the plates upward. The lock is easily released by handles on the sides of the base.

28 Claims, 8 Drawing Sheets

TILTABLE AUXILIARY CHAIR HAVING LOCKING MEANS AND PIVOTAL SEAT BELT ENGAGEMENT PLATE FOR FORWARD AND REARWARD FACING

DETAILED DESCRIPTION OF THE DEVICE

The present device relates to an auxiliary chair which is installed on the seat of a motor vehicle so that a child sits in the chair.

It is very dangerous for a child to sit alone on the seat of a motor vehicle without a restraint. To avoid the danger, an auxiliary chair is provided to hold the child therein. The auxiliary chair is generally known as a "car seat" or the like, and is well known. The auxiliary chair is fastened to the seat of the vehicle by the seat belt thereof. The auxiliary chair can be either oriented forward with regard to the direction of the vehicle so as to make the child sit in the chair to face forward, or oriented backward with regard to the direction of the vehicle so as to make the child sit in the chair to face backward. The body of the auxiliary chair, which is for holding the child therein, is a single structure and is directly fastened to the seat of the vehicle.

Since it had recently become a requirement to put the auxiliary chair in a reclining position on the seat of the motor vehicle, other conventional auxiliary chairs, each composed of a base and a body, which is mounted on the base and can be put into a reclining position thereon by operating a manipulation mechanism provided at the front portion of the base, were developed as disclosed in the Japanese Patent Applications (OPI) Nos. 65824/88 and 235137/88 (the term "OPI" as used herein means an "unexamined published application"). However, the latter conventional auxiliary chairs have problems as follows:

(1) When the auxiliary chair disclosed in the Japanese Patent Application (OPI) No. 65824/88 is installed on the seat of the motor vehicle, the seat belt thereof is only engaged with the base of the auxiliary chair and not engaged with the body thereof. In other words, the auxiliary chair is not firmly coupled to the seat of the vehicle. For that reason, if the auxiliary chair receives a sharp impact at the time of abrupt stoppage of the vehicle due to sharp braking, collision or the like, a strong force is likely to act on the body of the auxiliary chair to move the body relative to the base and separate the body from the base. This is dangerous.

(2) When the auxiliary chair disclosed in the Japanese Patent Application (OPI) No. 235137/88 is installed on the seat of the motor vehicle, the seat belt thereof is only engaged with the body of the auxiliary chair and not engaged with the base. For that reason, if the auxiliary chair receives a sharp impact at the time of abrupt stoppage of the vehicle due to sharp braking, collision or the like, a strong force is likely to act to the base of the auxiliary chair so as to move the base relative to the body and to make the engagement of the base with the seat belt unstable. This is dangerous. Besides, since the body of the auxiliary chair is fastened to the seat of the vehicle by the seat belt thereof, the seat belt needs to be disengaged from the auxiliary chair every time the chair is put in a reclining position. This is troublesome.

(3) Since a means for engaging the seat belt of the motor vehicle with the base of the auxiliary chair is designed for the case where the chair is oriented in a forward direction, it is difficult to appropriately engage the seat belt with the base when the body of the chair is oriented backward.

(4) Since a manipulation mechanism for putting the body of each of the auxiliary chairs in the reclining position is provided at the front portion of the base of the chair, namely, under the front of the body thereof, it is difficult for a person sitting in the driver's seat of the vehicle to manipulate the mechanism. For that reason, if the auxiliary chair is to be put in the reclining position, the person needs to move from the driver's seat to a position in front of the auxiliary chair and operate the manipulation mechanism. This is troublesome.

(5) When each of the auxiliary chairs is to be put in the reclining position by a person outside the vehicle opposite the driver's seat, he cannot help taking an overstrained posture, even if he reaches out his hand. For that reason, it is not easy to operate the manipulation mechanism.

SUMMARY OF THE INVENTION

The present device was made in order to solve the above-mentioned problems.

Accordingly, it is an object of the present device to provide an auxiliary chair which is installed on the seat of a motor vehicle and whose base and body are both engaged with the seat belt of the vehicle so that the base and the body are stably held on the seat of the vehicle even if the auxiliary chair receives an impact due to the abrupt stoppage of the vehicle or the like.

It is another object of the present device to provide an auxiliary chair which is installed on the seat of a motor vehicle and is such that the tilt angle of the chair fastened to the seat by the seat belt of the vehicle can be easily adjusted without disengaging the seat belt from the chair; the tilt angle of the body of the chair, which is mounted on the base thereof, can be easily adjusted by a person sitting on the driver's seat of the vehicle or present elsewhere; and a means for performing the adjusting is simple in constitution.

In the auxiliary chair provided in accordance with the present device so as to be installed on the seat of the motor vehicle, the base and the body mounted on the base and capable of being tilted forward and backward into a reclining position are included in combination. Two support shafts and an engagement shaft project sideways from both the sides of the body of the auxiliary chair and are located at prescribed intervals. The body is coupled to the base by the two support shafts so that the body is tiltable. The outer support shaft is slidably engaged in the sliding openings of engagement plates having engagement portions for the seat belt of the vehicle and attached to the sides of the base so that the engagement plates can be swung over backward and forward. The inner support shaft, which is located between the outer support shaft and the engagement shaft, is engaged in the sliding openings of lock plates, each of which has a plurality of engagement openings and the sliding opening which is for guiding the support shaft in sliding it therein. The lock plates are moved up or down as manipulation levers attached to the sides of the base are moved up or down. The engagement shaft is engaged in the sliding openings of the engagement plates when the plates are swung over.

DETAILED DESCRIPTION AND PREFERRED EMBODIMENT

An embodiment of the present device is hereafter described in detail with reference to the drawings attached hereto.

Figure 1:
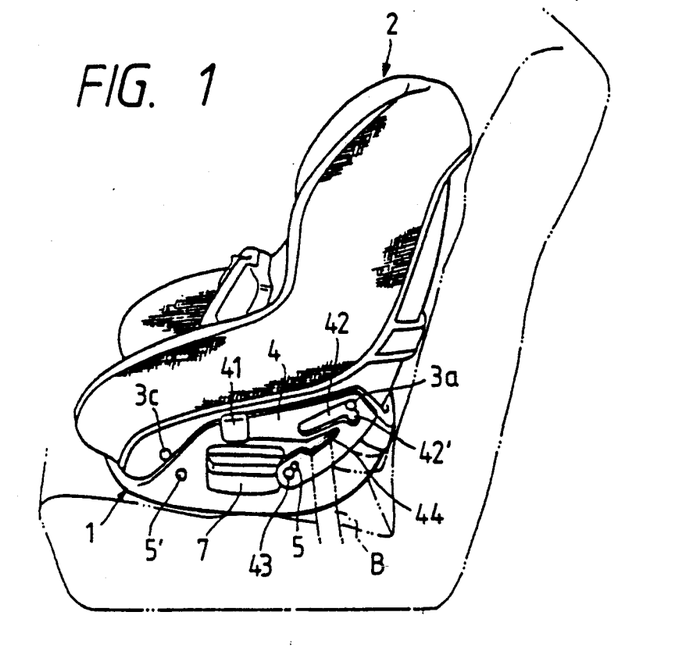
FIG. 1 a side view of an auxiliary chair which is an embodiment of the present device and installed on the seat of a motor vehicle, in the state of being oriented forward.
Figure 2:
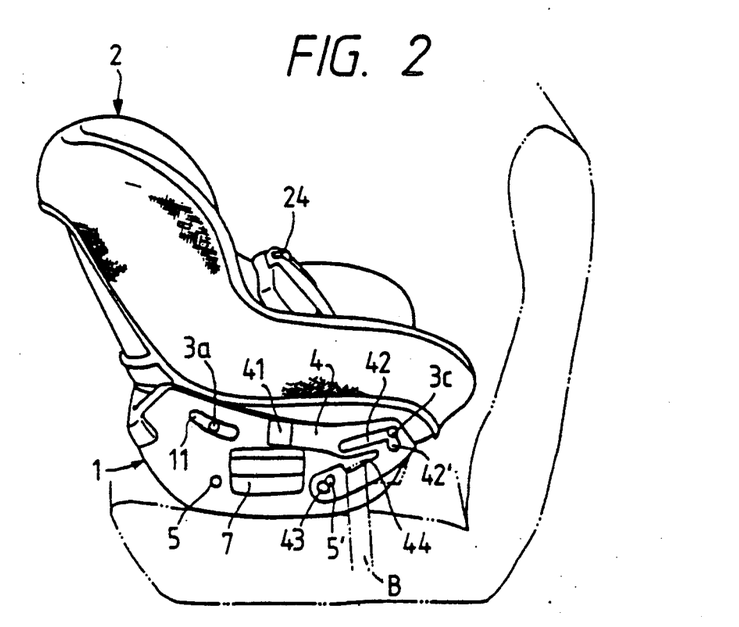
FIG. 2 is a side view of the auxiliary chair installed on the seat of the vehicle, in the state of being oriented backward.
Figure 3:
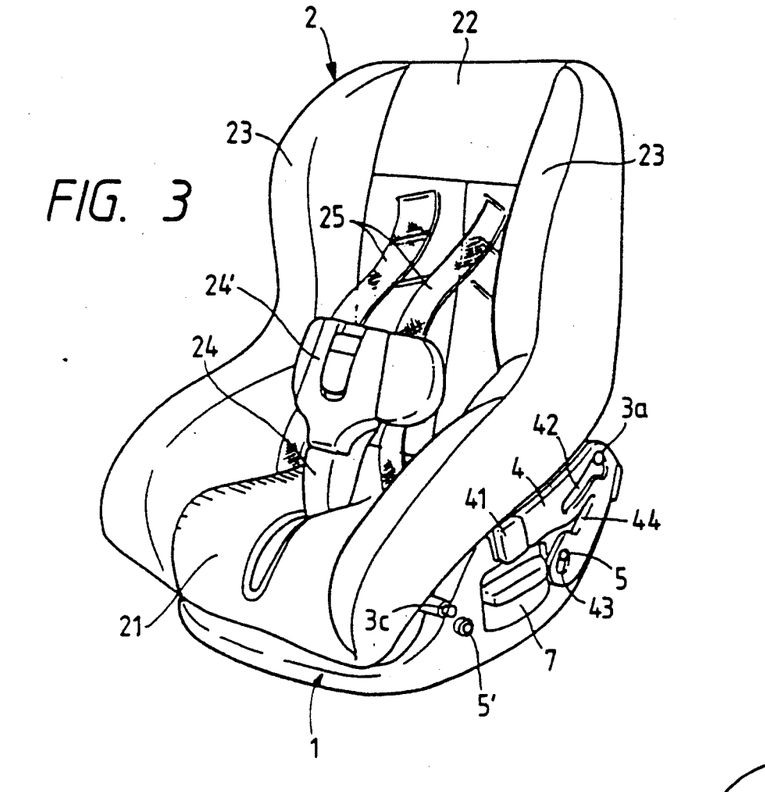
FIG. 3 is a perspective view of the auxiliary chair.
Figure 4:
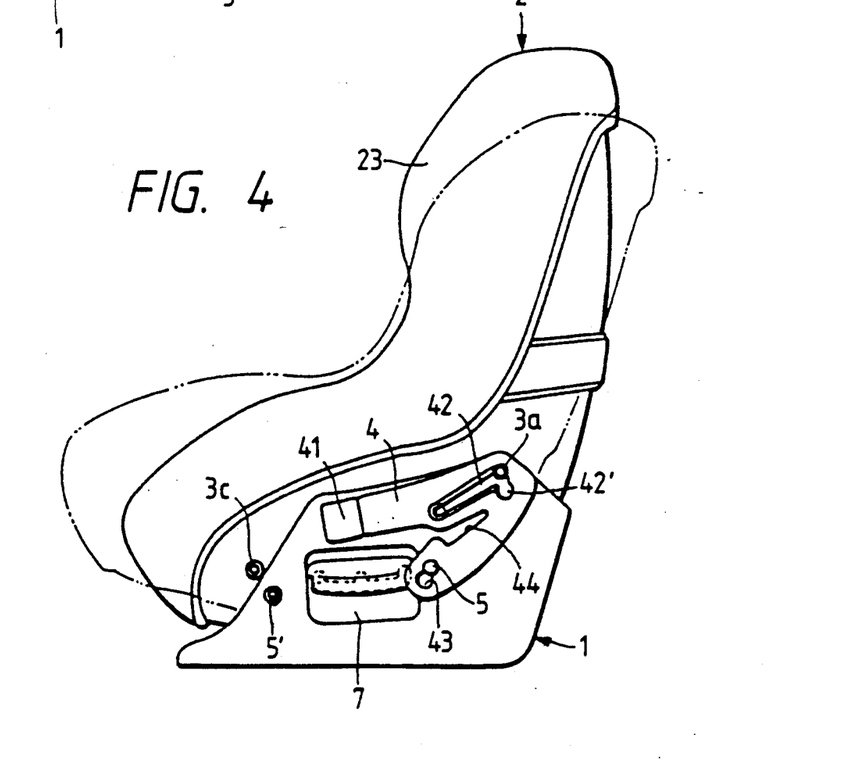
FIG. 4 is a side view of the auxiliary chair, which shows that the tilt angle of the body of the chair is changed.
Figure 5:
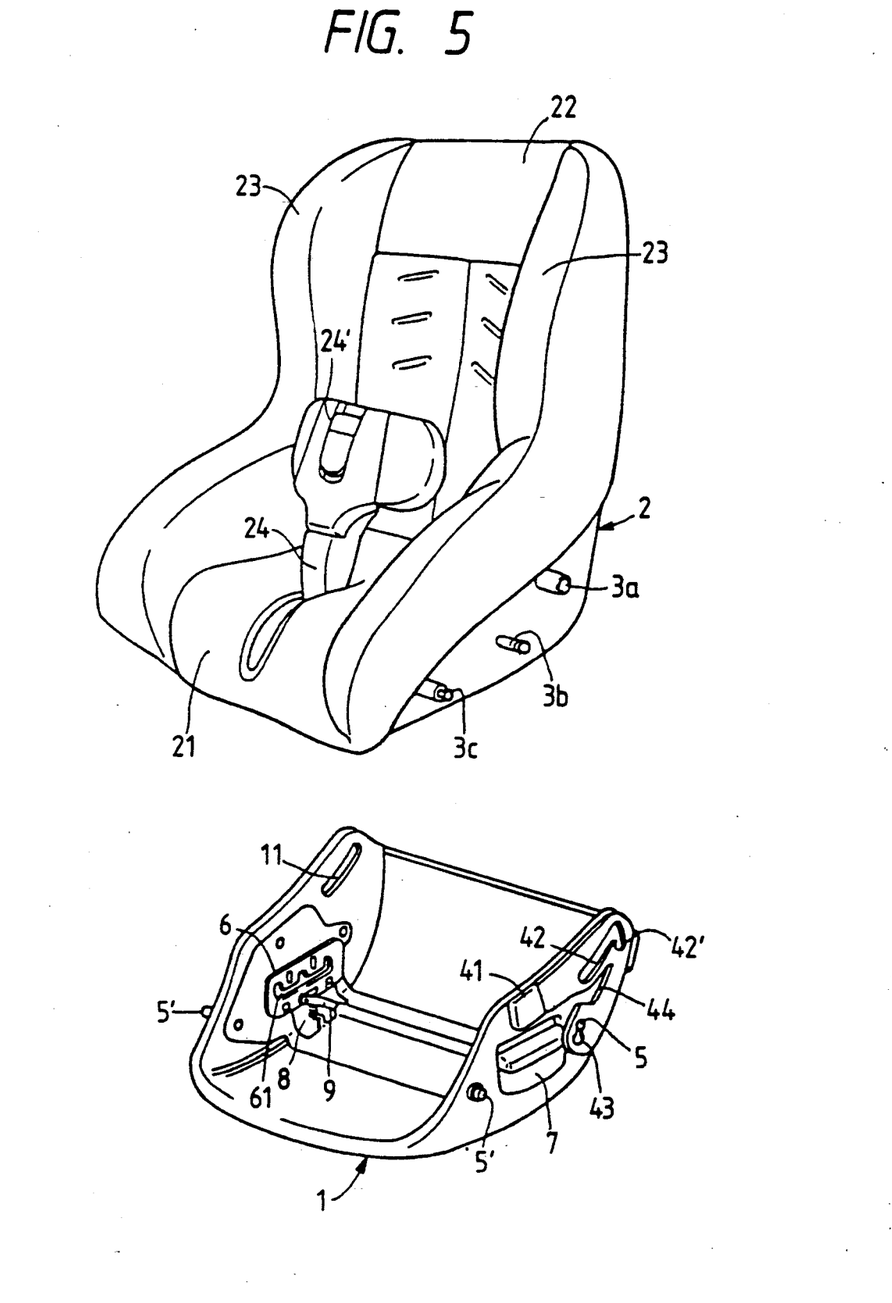
FIG. 5 is a perspective exploded view of the body and base of the auxiliary chair.

FIGS. 1 through 5 show an auxiliary chair in accordance with a preferred embodiment. The auxiliary chair, which is installed on the seat of a motor vehicle, is composed of a base 1 and a body 2 mounted thereon so that the body can be tilted backward into a reclining position and untilted forward into the original position thereof. The body 2 includes a seat 21, and a back 22 extending upward continuously from the rear end of the seat so that the back and the seat are nearly in the shape of an L. The body 2 also includes side walls 23 extending from both the side edges of the seat 21 and the back 22, as shown in FIGS. 3, 4 and 5, so that the side walls restrict the sideward movement of a child sitting in the body 2. The body 2 further includes a leg support 24 with belts 25 for holding the child in the body 2. The leg support engages and extends upward from the seat 21 and can be swung down to the front end of the top of the seat. To engage the belts 25 with the leg support 24, the engagement portion 24' of the support, which is provided at the center of the top of the support and can be opened and closed, is opened and the halfway portions of the belts are then engaged in engagement openings provided in the inside of the leg support but not shown in the drawings. Since the means for engaging the belts 25 with the leg support 24 is known and is not a novel feature of the invention claimed, the means is not described in detail herein.

Figure 8:
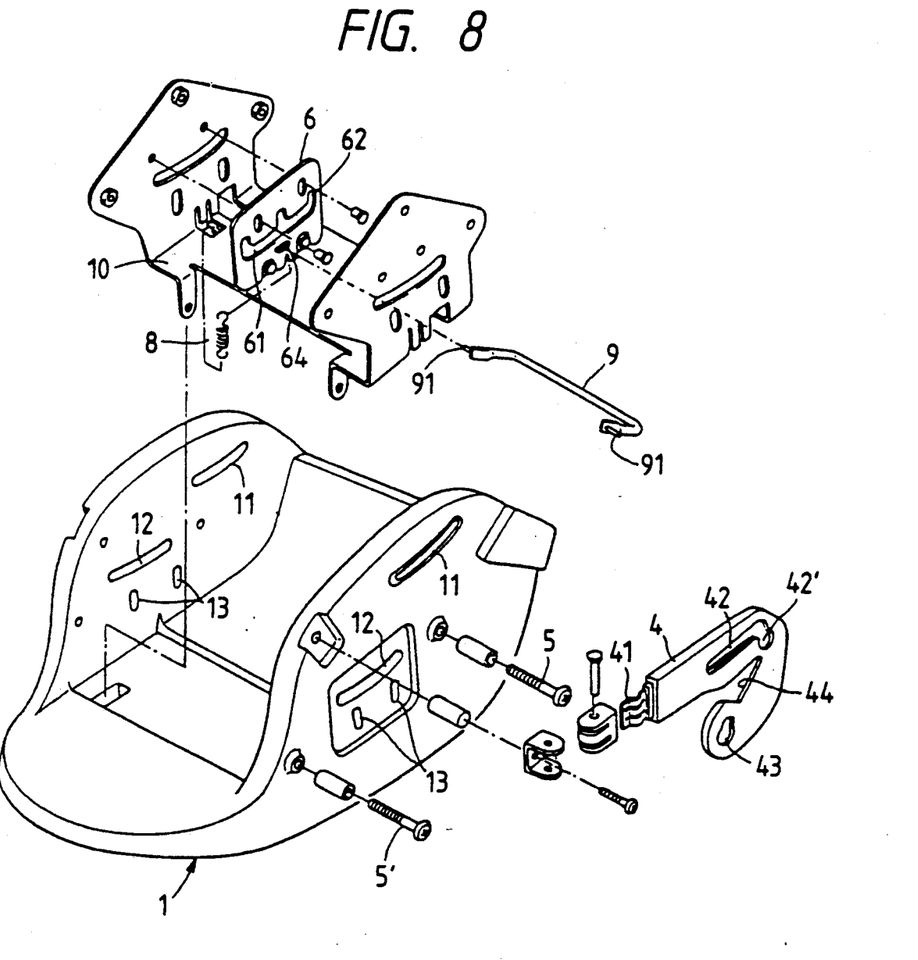
FIG. 8 is a perspective exploded view of the base.

As shown in FIG. 5, two support shafts 3a and 3b and an engagement shaft 3c project from both sides of the body 2 of the auxiliary chair. The support shafts 3a and 3b are for coupling the body 2 of the chair to the base 1 thereof so that the body can be tilted into the reclining position and untilted out of it. The support shafts 3a and 3b project by an appropriate length from both sides of the body 2, extend through the sliding openings 11 and 12 (FIG. 8) of the sides of the base 1, and project from both the sides of the base. The sliding openings 11 and 12 are located in positions corresponding to those of the support shafts 3a and 3b projecting from the sides of the body 2, and are shaped to enable the support shafts to draw the same sliding locus in the openings so as to ensure that the body 2 is accurately tilted into the reclining position and untilted out of it. The support shaft 3a is located behind the support shaft 3b with regard to the direction of the auxiliary chair, and serves as a guide in tilting the body 2 into the reclining position and in untilting it out of the reclining position. The support shaft 3b is located at the center of the front-to-rear length of the body 2, serves as a guide in tilting the body into the reclining position and in untilting it out of the reclining position, and also serves as an engagement shaft for fixing the body at a tilt angle.

Figure 6:
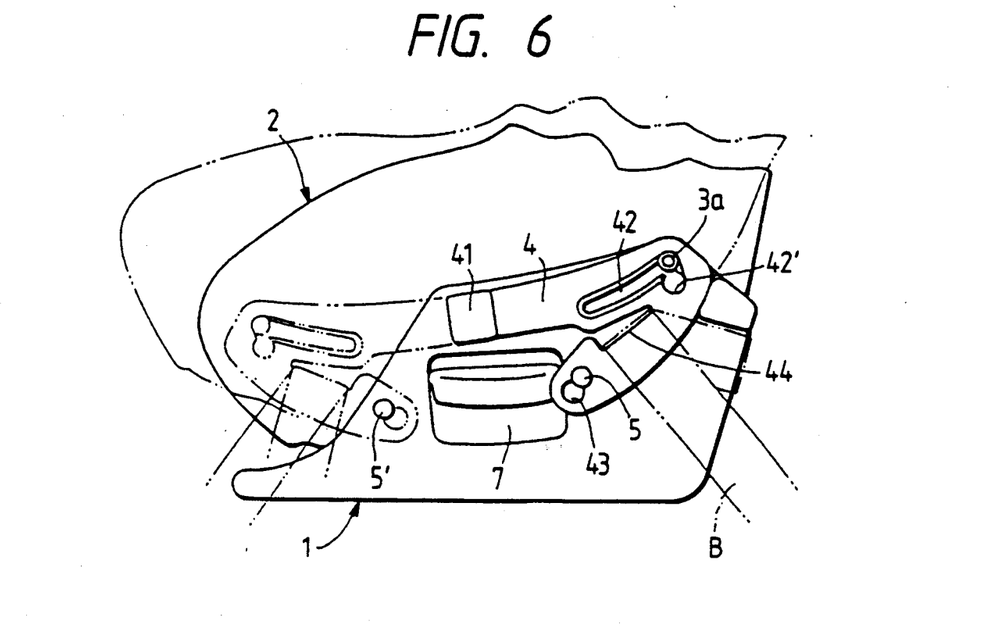
FIG. 6 is an enlarged side view of a major part of the auxiliary chair, which shows that an engagement plate is fitted with a support shaft and a fixed pin and engaged with a seat belt.
Figure 13:
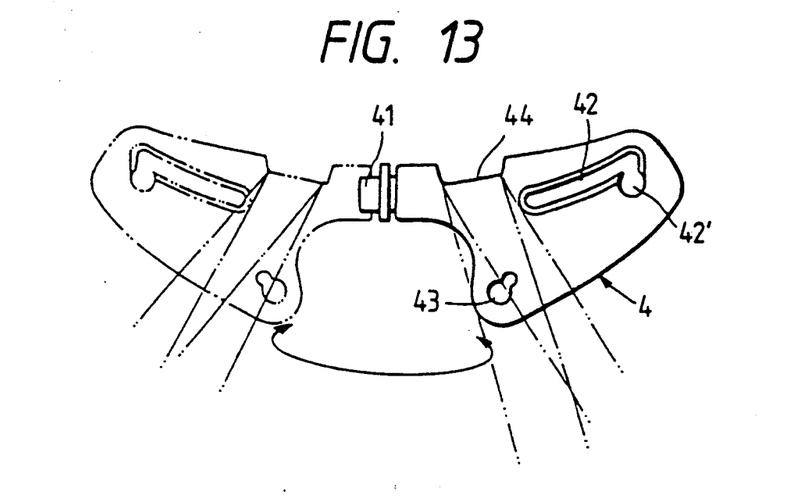
FIGS. 13 and 14 are side views of modifications of the engagement plate.

The engagement shaft 3c is engaged in the sliding openings 42 of engagement plates 4 when the plates are swung over to the front portion of the seat 21 of the body 2 as shown in FIG. 2. In that case, the two support shafts 3a and 3b and the engagement shaft 3c are all used, and the auxiliary chair is installed on the seat of the vehicle so that the chair is oriented backward with regard to the direction of the vehicle and the child sitting in the chair faces reversely to the driver of the vehicle. The engagement plates 4 are attached to the sides of the base 1 so that the plates can be swung over backward and forward. The butts 41 of the plates 4 are pivotally coupled to the base 1. The plates 4 have the sliding openings 42 near the tips of the plates, fitting openings 42' continuous to the sliding openings and located near the tips of the plates, and fitting openings 43 located slightly away from the former fitting openings so as to be engaged with fixed pins 5 or 5' projecting from the sides of the body 2. The fixed pins 5 and 5' are located at appropriate intervals. When the engagement plates 4 are attached at the rear portion of the body 2, the positions of the sliding openings 42 coincide with those of the sliding openings 11 of the sides of the base 1 so as to ensure that the support shaft 3a can be smoothly moved in tilting and untilting the body. The fixed pins 5 and 5' project from the sides of the body 2 and are located symmetrically to each other across the pivotally coupled butts 41 of the engagement plates 4 so that the distance between the fixed pins on each of the sides of the body is equal to that between the pivotally coupled butt 41 and fitting opening 43 of the engagement plate, as shown in FIG. 6. For that reason, when the engagement plates 4 are swung over either forward or backward, the fixed pins 5 or 5' are engaged in the fitting openings 43 of the plates. The engagement plates 4 have engagement portions 44, with which the seat belt B of the vehicle is engaged. Each of the engagement portions 44 is located between the fitting openings 42' and 43. The engagement portions 44 are not confined to being located as shown in FIGS. 1, 2, 3, 4, 5, 6, 7, 8, 9 and 10, but may be located at the tops of the engagement plates 4 as shown in FIG. 13 or be located in other appropriate positions. However, the highest effect of the engagement portions 44 on the engagement of the seat belt B therewith is produced when the engagement portions are located between the fitting openings 42' and 43 as shown in FIGS. 1, 2, 3, 4, 5, 6, 7, 8, 9 and 10.

Figure 14:
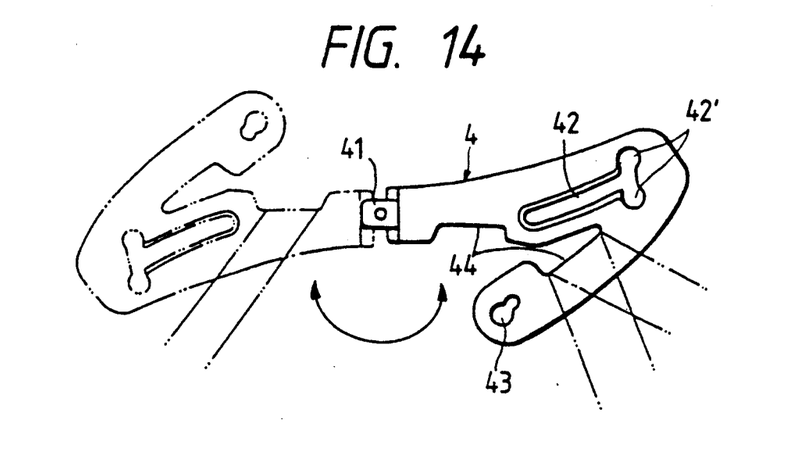

Although the engagement plates 4 are swung over backward and forward about the pivoted butts 41 thereof in the embodiment as shown in FIGS. 1, 2 and 6, the present device is not confined thereto but may be otherwise embodied so that the engagement plates are rotated about the pivoted butts thereof as shown by arrows in FIG. 14. The fitting openings 42' and 43 of each of the engagement plates 4 are located at a prescribed distance from each other, and extend through the plate. The fitting openings 42' and 43 have nearly circular portions whose diameters are such that the outer ends of the support shaft 3a, the engagement shaft 3c and the fixed pins 5 and 5' can be inserted into the portions. The fitting openings 42' and 43 have other portions whose widths or diameters are smaller than the diameters of the nearly circular portions so that the outer ends of the shafts 3a and 3c and the pins 5 and 5' cannot be inserted into the smaller portions, but the other portions of the shafts and the pins can be engaged in the smaller portions.

The fixed pins 5 and 5' are used to firmly couple the engagement plates 4 to both the base 1 and the body 2, but need not be used if the engagement plates are firmly coupled to both the base and the body by another means. As an example of such other means, the plates pivotally coupled at the butts 41 thereof to the base 1 may be engaged at the tips of the plates with the support shaft 3a engaged in the body 2, so that the engagement plates are firmly coupled to the base and the body. In that case, the engagement portions 44, with which the seat belt B of the vehicle is engaged, are located between the support shaft 3a and the pivoted butts 41 of the engagement plates 4 so as to make the engagement as firm as in the embodiment illustrated.

Figure 9:
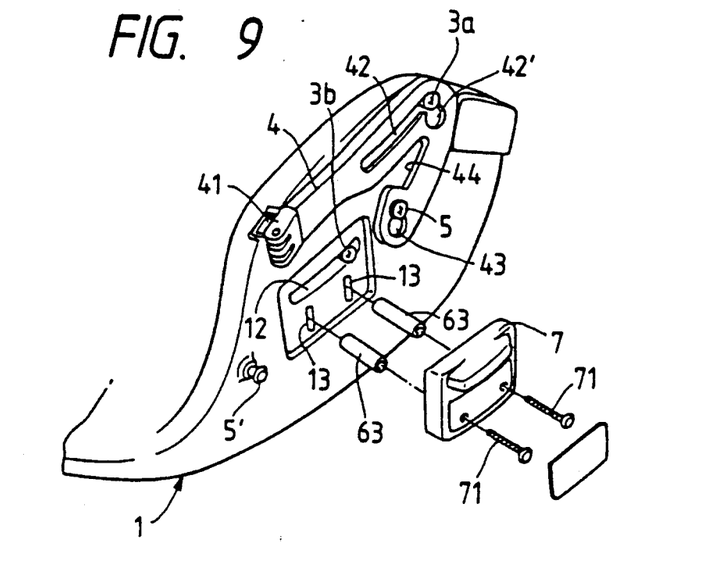
FIG. 9 is a perspective exploded view of a major part of the auxiliary chair, in which a manipulation lever is attached to the base.

Lock plates 6 for keeping the tilt angle of the body 2 fixed are attached to the inside surfaces of the side walls of the base 1 so that the lock plates can be moved up and down. Each of the lock plates 6 has a sliding opening 61 extending horizontally. The support shaft 3b extending through the sides of the body 2 are fitted in the sliding openings 61 at both the ends of the shafts so that the openings guide the shaft in sliding it therein. Each lock plate 6 also has a plurality of engagement openings 62 continuous to the sliding opening 61, as shown best in FIG. 12. Vertical movement guide bars 63 project sideways from the lock plates 6, extend through sliding guide openings 13 provided in the sides of the base 1 and extending vertically. The guide bars 63 are secured at the tips thereof to manipulation levers 7 (FIG. 9). The levers 7 are located on the outside surfaces of the sides of the base 1, and secured to the vertical movement guide bars 63 by screws 71.

Tension springs 8 (FIG. 8) are engaged with the lock plates 6 and the base 1 so that the plates are always urged to be pulled down. As a result, it is ensured that the support shaft 3b is stably engaged in the engagement openings 62 of the lock plates 6. If the engagement openings 62, which are provided in the lock plates 6 over the sliding openings 61 thereof in the embodiment as shown in the drawings, are provided in the plates under the sliding openings, the springs 8 are provided in upper positions over lower positions shown in the drawings.

Figure 10:
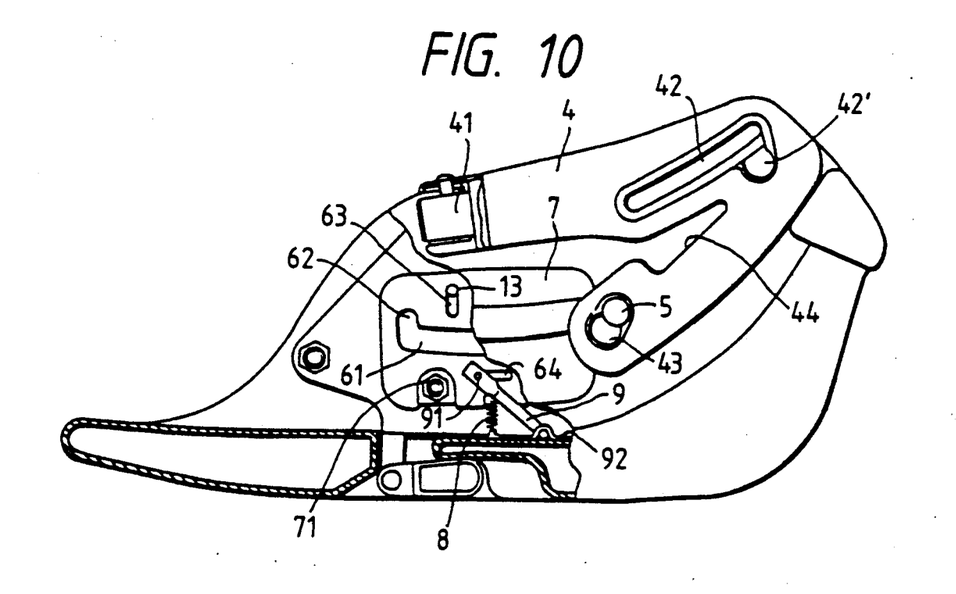
FIG. 10 is an enlarged cutaway side view of the base.
Figure 11:
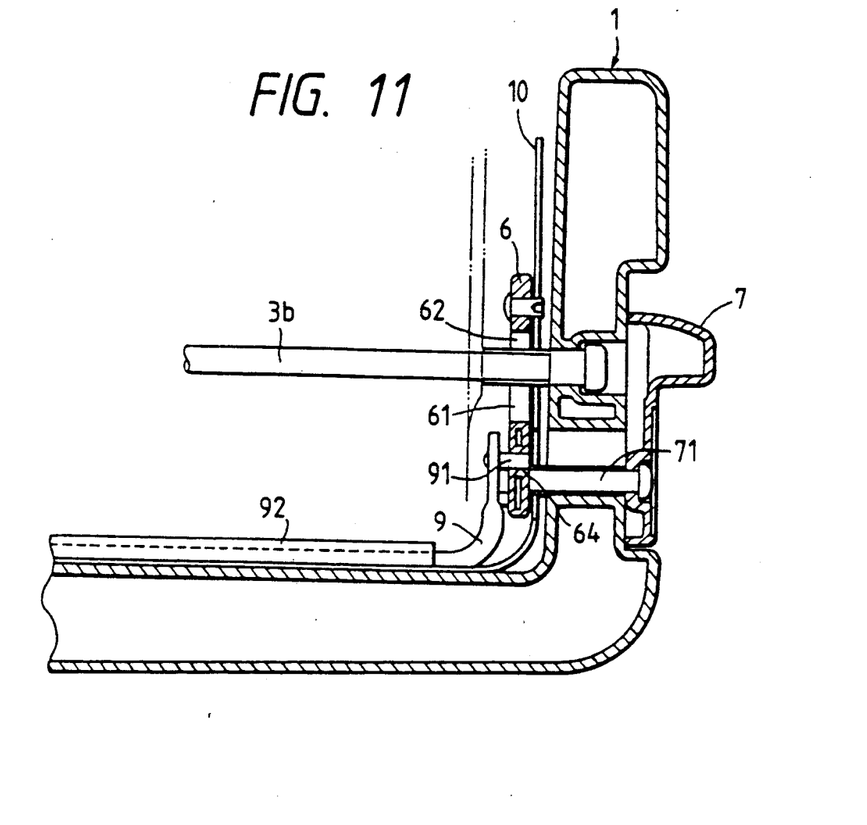
FIG. 11 is a vertically sectional view of the major part shown in FIG. 10.

A U-shaped transmission crank 9 (FIG. 8) for moving both lock plates 6 up and down at the same time has a central portion and bent end portions bent from the central portion and having an appropriate height. Engagement pins 91 project sideways from the upper ends of the end portions of the crank 9, and are engaged in the vertical movement guide openings 64 of the lock plates 6 attached to the sides of the base 1 so that the plates are movable up and down. The central portion of the crank 9 is coupled to the base 1 by a holder 92 so that the crank is swingable. The holder 92 has a central protruded portion under which the crank 9 extends through, as shown in FIGS. 10 and 11.

An inner plate 10 constitutes a part of the base 1, and has a central portion to which the central portion of the crank 9 is attached. The inner plate 10 also has side walls having portions to which the lock plates 6 and so forth are attached.

Although the engagement plates 4 can be swung over forward and backward in the embodiment (swung out of the paper as seen in FIG. 6), the present device is not confined thereto but may be otherwise embodied so that the engagement plates are attached to the rear portion of the base 1 as shown in FIGS. 1, 3 and 4 and cannot be swung over forward.

The use of the auxiliary chair is described in detail below.

I. The first description is for use of the auxiliary chair in the forward orientation.

EXAMPLE 1 OF OPERATION (1) An engagement member attached to the end of the seat belt B of the motor vehicle is first engaged with a buckle attached to the end of the other seat belt of the vehicle. As a result, the seat belt B is always urged by a retractor in such a direction as to be wound. For that reason, the seat belt B is tightened.

(2) The auxiliary chair is then put on the seat of the motor vehicle as shown in FIG. 1. The engagement plates 4 are placed in advance at the rear portion of the base 1 as shown in FIGS. 1, 3 and 4. At that time, the support shaft 3a and the fixed pins 5 are required not to be engaged in the fitting openings 42' and 43 of the engagement plates 4, so that the plates can be swung.

(3) A portion of the tightened seat belt B is then pulled so that the belt is forcibly loosened. The loosened portion is pulled from the rear portion of the body 2 of the auxiliary chair toward the base 1 thereof, and engaged with the seat belt engagement portions 44 of the engagement plates 4.

Figure 7:
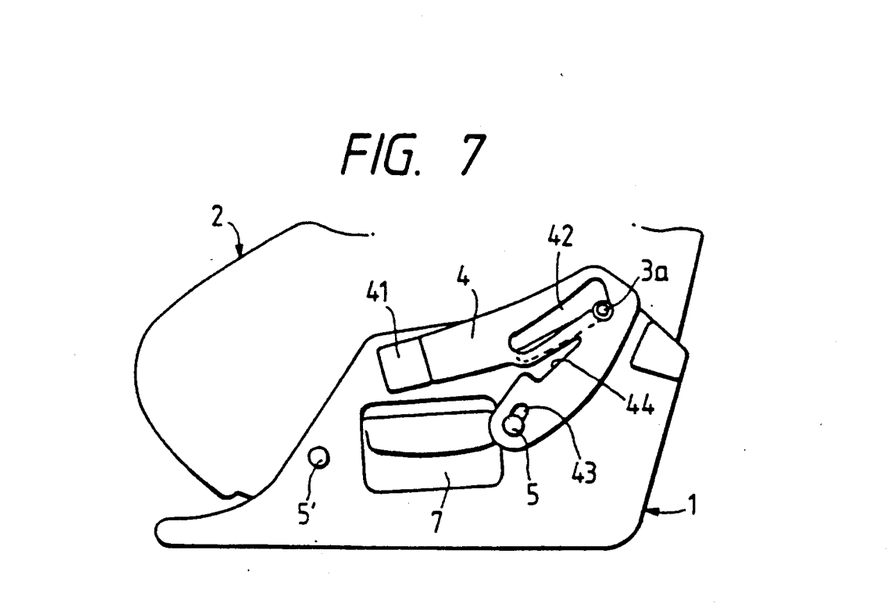
FIG. 7 is an enlarged side view of a major part of the auxiliary chair, which shows the beginning of the fitting of the engagement plate with the support shaft and the fixed pin.

(4) The engagement plates 4 are then swung so that the inside surfaces thereof are put into pressure contact with the sides of the base 1, the ends of the support shaft 3a projecting at the rear portion of the body 2 are engaged in the fitting openings 42' provided in the engagement plates and continuous to the sliding openings 42 thereof, and the fixed pins 5 projecting from the sides of the base 1 are engaged in the other fitting openings 43 of the engagement plates, as shown in FIG. 7.

(5) The engagement plates 4 are thereafter pushed down at the tips thereof in the direction of the pulling of the plates pulled by the seat belt B, so that the fixed pins 5 are fitted in the smaller-diameter portions of the fitting openings 43, and the support shaft 3a is fitted in the sliding openings 42 continuous to the fitting openings 42', as shown in FIG. 6. The auxiliary chair is thus installed on the seat of the motor vehicle. As a result, the auxiliary chair is fastened to the seat of the vehicle so that the base 1 and body 2 of the chair are stably pulled toward the rear of the seat of the vehicle. For that reason, the auxiliary chair is prevented from moving unexpectedly.

EXAMPLE 2 OF OPERATION

In the operation procedure described in example 1, the auxiliary chair is fastened to the seat of the motor vehicle while the engagement plates 4 are initially disengaged from the support shaft 3a and the fixed pins 5 and subsequently engaged. The chair can be also fastened to the seat of the vehicle in a conventional procedure different from the former procedure. In the conventional procedure, the support shaft 3a and the fixed pins 5 are engaged in the fitting openings 42' and 43 of the engagement plates 4 in advance of the procedure, and the plates are pushed down so that the plates are made unswingable. The engagement member attached to the end of the seat belt B, which is not yet engaged with the buckle attached to the end of the other seat belt, is thereafter inserted upward into the gap between the base 1 and each engagement plate 4, pulled up through the gap, and engaged with the buckle. The base 1 and the body 2 of the auxiliary chair are thus fastened to the seat of the vehicle.

II. The second description is for use of the auxiliary chair being placed in the reclining position.

Figure 12:
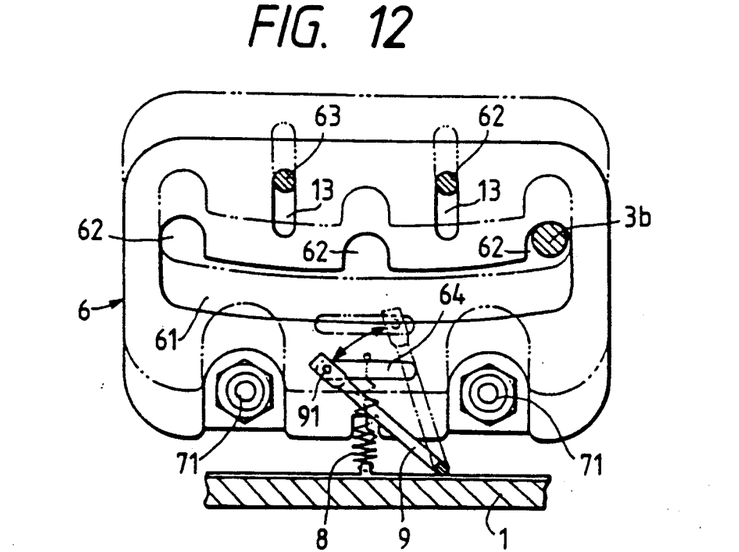
FIG. 12 a side view of a major part of the auxiliary chair, in which a lock plate and a transmission crank are fitted with each other.

(1) To change the tilt angle of the body 2 of the auxiliary chair, at least one of the manipulation levers 7 attached to the sides of the base 1 of the chair and movable up and down is first lifted. Since the inside surfaces of the levers 7 are coupled to the sliding guide bars 63 projecting from the lock plates 6, the plates are moved up against the contractive forces of the springs 8 at the time of the lifting of the manipulation lever. Since the support shaft 3b is engaged in the engagement openings 62 of the locking plates 6 before the upward movement thereof as shown in FIG. 12, the body 2 is kept from being tilted. When the lock plates 6 are moved up to positions shown by two-dot chain lines in FIG. 12, at the time of the lifting of the manipulation lever 7, the engagement grooves 62 of the plates are disengaged from the support shaft 3b and the shaft is located in the sliding openings 61 of the plates. As a result, the lock plates 6 are unlocked from the support shaft 3b so that the body 2 can be tilted into the reclining position.

(2) Since the engagement pins 91 projecting sideward from the upper ends of the end portions of the transmission crank 9 are engaged in the vertical movement guide openings 64 of both the lock plates 6 attached to the sides of the base 1 so as to be located in mutually opposite positions and movable up and down, the end portions swung down into positions shown by a full line in FIG. 12 are swung up as shown by an arrow in FIG. 12 and reach positions shown by a two-dot chain line therein, when at least one of the lock plates is moved up. Both the lock plates 6 are thus moved up because they are coupled to each other by the transmission crank 9. As a result, both the lock plates 6 are simultaneously unlocked from the support shaft 3b.

(3) Since the lock plates 6 always receive the pulling-down forces of the springs 8, the lock plates are instantaneously moved down when the support shaft 3b is moved from the engagement openings 62 of the plates to positions under the other engagement openings 62 thereof during the tilting of the body 2 into the reclining position, so that the support shaft 3b is engaged in the latter engagement openings. As a result, the lock plates 6 are locked. After the support shaft 3b is engaged in the latter engagement openings 62, the body 2 is kept from being tilted again.

Since the support shafts 3a and 3b provided in parallel with each other as shown in FIG. 5 are slidably fitted in the sliding openings 11 and 12 provided in the sides of the base 1 and extending in parallel with each other, the support shafts are always simultaneously moved.

When the support shaft 3b engaged in one of the engagement openings 62 of the lock plate 6 is to be disengaged therefrom and engaged in the other engagement opening 62 located farther than the support shaft than the still other engagement opening 62 located next to the most preceding engagement opening 62, so that the reclining tilt angle of the body 2 is increased, the body is tilted as the manipulation levers 7 remain lifted. The body 2 can thus be easily shifted to a desired reclining tilt angle, because the lock plates 6 are kept from being moved down.

III. The third description is for the auxiliary chair being used in the backward orientation.

(1) When the auxiliary chair used in the forward reclining position is to be used in the backward position, the body 2 of the chair is first put out of the reclining position into an upright position.

(2) As a result, the support shaft 3a in the sliding openings 42 of the engagement plates 4 is moved to the ends of the openings, which are continuous to the fitting openings 42' of the plates. The engagement plates 4 are then lifted. Consequently, the support shaft 3a is moved into the fitting openings 42', and the fixed pins 5 are moved similarly to the support shaft, so that the support shaft can be disengaged from the engagement plates at the fitting openings 42' thereof and the fixed pins 5 can be disengaged from the plates at the fitting openings 43 thereof. It is thus made possible that the engagement plates 4 are swung over forward about the pivotally coupled butts 41 thereof.

(3) The auxiliary chair oriented forward on the seat of the motor vehicle as shown in FIG. 1 is thereafter reoriented backward thereon as shown in FIG. 2.

(4) The engagement plates 4 located as shown in FIGS. 1, 3 and 4 are then swung over to the front portion of the base 1. The seat belt B of the vehicle is thereafter engaged with the engagement plates 4 in the same way as in the case I. For the engagement, the engagement member on the end of the seat belt B is engaged with the buckle on the end of the other seat belt of the vehicle so that the seat belt B is tightened. After the seat belt engagement portions 44 of the engagement plates 4 are thus engaged with the seat belt B, the engagement shaft 3c projecting from the front portion of the seat 21 is engaged at the ends of the shaft in the fitting openings 42' continuous to the sliding openings 42 in the engagement plates, and the fixed pins 5' projecting from the sides of the base 1 are engaged in the other fitting openings 43 of the plates. The ends of the engagement plates 4 are thereafter pushed down so that the fixed pins 5' are engaged in the smaller-diameter portions of the fitting openings 43 and the engagement shaft 3c is engaged in the sliding openings 42, as shown by two-dot chain lines in FIG. 6.

(5) When the tilt angle of the body 2 of the auxiliary chair is then to be changed, the same operation as in the case II is performed. The body 2 can thus be easily put into a reclining position.

Effect of the device

The auxiliary chair provided in accordance with the present device produces desirable effects as follows:

(1) Since the base 1 and body 2 of the auxiliary chair are fastened to the seat of the motor vehicle by the engagement plates 4 attached to the sides of the base so as to be capable of being swung over forward and backward, the base and the body can be easily and accurately coupled to the seat of the vehicle.

(2) Since the seat belt B of the vehicle is engaged with the engagement portions 44 of the engagement plates 4, the effect of the engagement is applied to both the base 1 and the body 2. In other words, since the support shaft 3a projecting from the sides of the body 2 is engaged in the sliding opening 42 of the engagement plates 4 and the fixed pins 5 projecting from the base 1 are engaged in the fitting openings 43 of the plates, both the base and the body are coupled to the plates. Besides, the seat belt B is engaged with the engagement portions 44 of the plates 4. As a result, both the base 1 and the body 2 are fastened to the seat of the vehicle by the seat belt B. For that reason, the base 1 and the body 2 are prevented from separating from each other by an accidental force in an emergency stoppage of the motor vehicle as would be the case in a conventional auxiliary chair where only one of the base and body is fastened to the seat of the vehicle by the seat belt.

(3) It is difficult to adjust the position of the engagement of the seat belt with the conventional auxiliary chair when the body of the chair is reoriented forward or backward. As for the auxiliary chair provided in accordance with the present device, the engagement plates 4 having the seat belt engagement portions 44 are attached to the base 1 of the chair and can be swung over backward and forward so that the engagement plates are always located at the rear portion of the seat of the motor vehicle, whether the body 2 of the chair is oriented forward or backward, as shown in FIGS. 1 and 2. For that reason, the seat belt B of the vehicle can be engaged with the engagement plates 4, constantly in prescribed positions, to more accurately fasten the auxiliary chair to the seat of the vehicle by the seal belt.

(4) As for the conventional auxiliary chair, a mechanism for adjusting the tilt angle of the body of the chair is provided at the front portion of the base of the chair. For that reason, a person who operates the chair into a reclining position needs to move his body to the vicinity of the front portion of the base. In other words, the manipulating property of the chair is not high. As for the auxiliary chair provided in accordance with the present device, the manipulation levers for changing the tilt angle of the body 2 of the chair are provided on the sides of the base 1 thereof so that a person sitting on the driver's seat of the vehicle can easily manipulate the chair into a reclining position by simply reaching out his hand and lifting the manipulation lever. Besides, a person present outside the door of the vehicle opposite the driver's seat thereof can also easily manipulate the auxiliary chair into a reclining position.

(5) Since the engagement pins 91 projecting sideward from the bent end portions of the U-shaped transmission crank 9 and swingable backward and forward are fitted in the vertical movement guide openings 64 of the two lock plates 6 attached to both the sides of the base 1 so that the lock plates are movable up and down and the support shaft 3b is engaged in the plates, both the lock plates coupled to each other can be simultaneously moved up by lifting at least one of the manipulation levers 7 to move up the corresponding one of the lock plates. In other words, the vertical movement of one of the lock plates 6 causes the swing of the transmission crank 9 coupled thereto, and the swing causes the vertical movement of the other lock plate. For that reason, both the manipulation levers 7 can be simultaneously moved up and down by moving only one of them up and down.

(6) Since the engagement plates 4 are provided on both the sides of the base 1, the auxiliary chair can be applied to the vehicle whether the steering wheel thereof is provided on the right side of the vehicle or on the left side thereof. Besides, the chair can be easily used whether it is oriented forward or backward.

What is claimed is:

1. An auxiliary chair for installation on a seat of a vehicle via a seat belt associated with said vehicle, said auxiliary chair comprising:
   a base having sides thereof with each side having a pair of first sliding openings;
   a body having a seat portion and a back portion and being tiltably mounted on said base for selectably reclining and upward orientation with respect to said base; said body having the form of a seat;
   a pair of engagement plates attached to the respective sides of said base; each said engagement plate having second sliding openings and a seat belt engagement portion comprising a third sliding opening for engagement with said vehicle seat belt and said third sliding opening;
   said body including two support shafts projecting out the opposite sides thereof for sliding engagement in respective first sliding openings in each of the sides of said base, and the first of said shafts further being in sliding engagement with said second sliding openings of said engagement plates.

2. An auxiliary chair for installation on a seat of a vehicle via a seat belt associated with said vehicle, said auxiliary chair comprising:
   a base having sides thereof with each side having a pair of first sliding openings;
   a body having a seat portion and a back portion and being tiltably mounted on said base for selectably reclining and upward orientation with respect to said base; said body having the form of a seat;
   a pair of engagement plates attached to the respective sides of said base; each said engagement plate having second sliding openings and a seat belt engagement portion for engagement with said vehicle seat belt and a third sliding opening;
   said body including two support shafts projecting out the opposite sides thereof for sliding engagement in respective first sliding openings in each of the sides of said base, and the first of said shafts further being in sliding engagement with said second sliding openings of said engagement plates.
   wherein said body further includes a third shaft projecting outwardly from the sides thereof like said first shaft and positioned symmetrically with respect to said first shaft; said engagement plates further being attached to said base sides in such a manner as to be movable from a first position whereby said third sliding openings therein slidably receive the projected ends of said first shaft to a second position whereby said third sliding openings therein slidable receive the projected ends of said third shaft, thereby allowing said seat to be oriented either frontward or rearward in said vehicle, with said seat belt engagement portions of said engagement plates serving in both orientations as the means for engaging said seat belts.

3. An auxiliary chair as claimed in claim 2, further comprising lock means on said engagement plates and said sides of said base for locking said engagement plates in either of said first and second positions.

4. An auxiliary chair as claimed in claims 2 or 3, wherein said engagement plates further comprise means for locking to said engagement plate the said shaft slidably projecting into the third sliding opening therein.

5. An auxiliary chair as claimed in claim 3, wherein said lock means comprises a lock opening on an extended portion of each said engagement plate and a pair of locking pins symmetrically positioned on each of said sides of said base; on each side of said base one of said locking pins being received in the said opening of the engagement plate attached to that side for locking said engagement plate in said first position, and the other of said locking pins being received in the said opening of the engagement plate attached to that side for locking said engagement plate in said second position.

6. An auxiliary chair as claimed in claim 2, wherein a first one of said first sliding openings in each side of said base communicates with the third sliding opening in said engagement plate attached to the side of said base when said engagement plate is in said first position.

7. An auxiliary chair as claimed in any of claims 2, 3, 5, or 6, wherein said engagement plates are pivotally attached to said side plates to pivot in a plane substantially parallel to the seat portion.

8. An auxiliary chair for installation on a seat of a vehicle via a seat belt associated with said vehicle, said auxiliary chair comprising:
 a base having sides thereof with each side having a pair of first sliding openings;
 a body having a seat portion and a back portion and being tiltably mounted on said base for selectably reclining and upward orientation with respect to said base; said body having the form of a seat;
 a pair of engagement plates attached to the respective sides of said base; each said engagement plate having second sliding openings and a seat belt engagement portion for engagement with said vehicle seat belt and a third sliding opening;
 said body including two support shafts projecting out the opposite sides thereof for sliding engagement in respective first sliding openings in each of the sides of said base, and the first of said shafts further being in sliding engagement with said second sliding openings of said engagement plates,
 wherein a first one of said first sliding openings in each of said base communicates with the third sliding opening in said engagement plate attached to the side of said base.

9. An auxiliary chair for installation to the seat of a vehicle, said chair comprising:
 a base having sides thereof an a body tiltably mounted on said base;
 a pair of lock plates mounted on the insides of the respective sides of said base;
 said body having a shaft projecting sideways therefrom and engageable with said lock plates for locking said body in selected positions of tilt of said body;
 said lock plates being mounted so as to be movable up and down so as to release or lock said body in a tilt position:
 each said lock plate having a horizontal opening for receiving a pins therein;
 a U-shaped transmission crank having pins on opposite ends thereof extending into said horizontal openings in said lock plates; said crank being fixed with respect to said base so that up/down movement of one of said lock plates is transmitted by said crank to the other of said lock plates.

10. An auxiliary chair as claimed in claim 9 further comprising bias means for biasing said lock plates in one of said up and down positions and handle means on the outside of each side of said base for moving said lock plates in the direction opposite said biased direction.

11. An auxiliary chair as claimed in claim 9, wherein each said lock plate has an elongated horizontal slot with lock position openings extending vertically therefrom at selected positions along said elongated horizontal openings; said shaft having ends which slidably slide in said elongated slot when said lock plates are in the first of said up and down positions and which lock in said lock openings when said lock plates are in the opposite of said first position.

12. An auxiliary chair as claimed in claim 11, further comprising bias means for biasing said lock plates in one of said up and down positions and handle means on the outside of each side of said base for moving said lock plates in the direction opposite said biased, direction.

13. An auxiliary chair as claimed in any of claims 10 or 12, wherein said bias means are springs.

14. An auxiliary chair for installation on the seat of a vehicle via a seat belt associated with said seat, said auxiliary chair comprising:
 a base having sides thereof, with each side having a pair of sliding openings;
 a body having a seat portion and a back portion and being tiltably mounted on said base for selectably reclining and upward orientation with respect to said base; said body having the form of a seat;
 a pair of engagement plates attached to the respective sides of said base; each said engagement plate having a seat belt engagement portion for engagement with said vehicle seat belt and a slide opening;
 said body including two support shafts projecting out the opposite sides thereof for sliding engagement in the respective sliding openings in each of the sides of said base, and the first of said shafts further being in sliding engagement with said slide openings of said engagement plates;
 a pair of lock plates mounted on the insides of the respective sides of said base;
 said second shaft being engageable with said lock plates for locking said body in selected positions of tilt of said body;
 said lock plates being mounted so as to be movable up and down so as to release or lock said body in a tilt position;
 each said lock plate having a horizontal opening for receiving a pin therein;
 a U-shaped transmission crank having pins on opposite ends thereof extending into said horizontal openings in said lock plates; said crank being fixed with respect to said base so that up or down movement of one of said lock plates is transmitted by said crank to the other of said lock plates.

15. An auxiliary chair as claimed in claim 14, wherein said body further includes a third shaft projecting outwardly from the sides thereof like said first shaft and positioned symmetrically with respect to said first shaft; said engagement plates further being attached to said base sides in such a manner as to be movable from a first position whereby said slide openings therein slidably receive the projected ends of said first shaft to a second position whereby said slide openings therein slidably receive the projected ends of said third shaft, thereby allowing said seat to be oriented either frontward or rearward in said vehicle, with said seat belt engagement portions of said engagement plates serving in both orientations as the means for engaging said seat belts.

16. An auxiliary chair as claimed in claim 15, further comprising lock means on said engagement plates and said sides of said base for locking said engagement plates in either of said first and second positions.

17. An auxiliary chair as claimed in any of claims 15 or 16, wherein said engagement plates further comprise means for locking to said engagement plate the said shaft slidably projecting into the slidable opening therein.

18. An auxiliary chair as claimed in claim 16, wherein said lock means comprises a lock opening on an extended portion of each said engagement plate and a pair of locking pins symmetrically positioned on each of said slides of said base; on each side of said base one of said locking pins being received in the said opening of the engagement plate attached to that side for locking said engagement plate in said first position, and the other of said locking pins being received on the said opening of the engagement plate attached to that side for locking said engagement plate in said second position.

19. An auxiliary chair as claimed in claim 15, wherein the first said sliding opening in each side of said base communicates with the slide opening in said engagement plate attached to the side of said base when said engagement plate is in said first position.

20. An auxiliary chair as claimed in claim 14, wherein the first said sliding opening in each side of said base communicates with the slide opening in said engagement plate attached to the side of said base.

21. An auxiliary chair as claimed in any of claims 16, 20, or 19, wherein said engagement plates are pivotally attached to said side plates to pivot in a plate substantially parallel to the seat portion.

22. An auxiliary chair as claimed in claim 21, wherein each said lock plate has an elongated horizontal slot with lock position openings extending vertically therefrom at selected positions along said elongated horizontal openings; said shaft having ends which slidably slide in said elongated slot when said lock plates are in the first of said up and down positions and which lock in said lock openings when said lock plates are in the opposite of said first position.

23. An auxiliary chair as claimed in claim 22 further comprising bias means for biasing said lock plates in one of said up and down positions and handle means on the outside of each side of said base for moving said lock plates in the direction opposite said biased direction.

24. An auxiliary chair as claimed in claim 14 further comprising bias means for biasing said lock plates in one of said up and down positions and handle means on the outside of each side of said base for moving said lock plates in the direction opposite said biased direction.

25. An auxiliary chair as claimed in claim 24 or, wherein said bias means are spring.

26. An auxiliary chair as claimed in claim 14, wherein each said lock plate has an elongated horizontal slot with lock position openings extending vertically therefrom at selected positions along said elongated horizontal openings; said shaft having ends which slidably slide in said elongated slot when said lock plates are in the first of said up and down positions and which lock in said lock openings when said lock plates are in the opposite of said first position.

27. An auxiliary chair for installation on the seat of a vehicle via a seat belt associated with said seat, said auxiliary chair comprising:
    a base having sides thereof, with each side having a pair of sliding openings;
    a body having a seat portion and a back portion and being tiltably mounted on said base for selectably reclining and upward orientation with respect to said base; said body having the form of a seat;
    a pair of engagement plates attached to the respective sides of said base; each said engagement plate having a seat belt engagement portion for engagement with said vehicle seat belt and a slide opening;
    said body including two support shafts projecting out the opposite sides thereof for sliding engagement in the respective sliding openings in each of the sides of said base, and the first of said shafts further being in sliding engagement with said slide openings of said engagement plates;
    a pair of lock plates mounted on the insides of the respective sides of said base;
    said second shaft being engageable with said lock plates for locking said body in selected positions of tilt of said body;
    said lock plates being mounted so as to be movable up and down so as to release or lock said body in a tilt position;
    each said lock plate having a horizontal opening for receiving a pin therein;
    a U-shaped transmission crank having pins on opposite ends thereof extending into said horizontal openings in said lock plates; said crank being fixed with respect to said base so that up or down movement of one of said lock plates is transmitted by said crank to the other of said lock plates;
    wherein said body further includes a third shaft projection outwardly from the sides thereof like said first shaft and positioned symmetrically with respect to said first shaft; and engagement plates further being attached to said base sides in such a manner as to be movable from a first position whereby said slide openings therein slidably receive the projected ends of said first shaft to a second position whereby said slide openings therein slidably receive the projected ends of said third shaft, thereby allowing said seat to be oriented either frontward or rearward in said vehicle, with said seat belt engagement portions of said engagement plates serving in both orientations as the means for engaging said seat belts;
    wherein said engagement plates further comprise means for locking to said engagement plate the said shaft slidably projecting into the slidable opening therein; and
    wherein said engagement plates are pivotally attached to said side plates to pivot in a plane substantially parallel to the seat portion.

28. An auxiliary chair for installation on the seat of a vehicle via a seat belt associated with said seat, said auxiliary chair comprising:
    a base having sides thereof, with each side having a pair of sliding openings;
    a body having a seat portion and a back portion and being tiltably mounted on said base for selectably reclining and upward orientation with respect to said base; said body having the form of a seat;

a pair of engagement plates attached to the respective sides of said base; each said engagement plate having a seat belt engagement portion for engagement with said vehicle seat belt and a slide opening;

said body including two support shafts projecting out the opposite sides thereof for sliding engagement in the respective sliding openings in each of the sides of said base, and the first of said shafts further being in sliding engagement with said slide openings of said engagement plates;

a pair of lock plates mounted on the insides of the respective sides of said base;

said second shaft being engageable with said lock plates for locking said body in selected positions of tilt of said body;

said lock plates being mounted so as to be movable up and down so as to release or lock said body in a tilt position;

each said lock plate having a horizontal opening for receiving a pin therein;

a U-shaped transmission crank having pins on opposite ends thereof extending into said horizontal openings in said lock plates; said crank being fixed with respect to said base so that up or down movement of one of said lock plates is transmitted by said crank to the other of said lock plates;

wherein said body further includes a third shaft projection outwardly from the sides thereof like said first shaft and positioned symmetrically with respect to said first shaft; said engagement plates further being attached to said base sides in such a manner as to be movable from a first position whereby said slide openings therein slidably receive the projected ends of said first shaft to a second position whereby said slide openings therein slidably receive the projected ends of said third shaft, thereby allowing said seat to be oriented either frontward or rearward in said vehicle, with said seat belt engagement portions of said engagement plates serving in both orientations as the means for engaging said seat belts;

lock means on said engagement plates and said sides of said base for locking said engagement plates in either of said first and second positions;

wherein said engagement plates further comprise means for locking to said engagement plate the said shaft slidably projecting into the slidable opening therein; and wherein said engagement plates are pivotally attached to said side plates to pivot in a plane substantially parallel to the seat portion.

* * * * *